US006842299B2

(12) United States Patent
Duon et al.

(10) Patent No.: US 6,842,299 B2
(45) Date of Patent: Jan. 11, 2005

(54) INDIVIDUAL CARRIER FOR AN OPTICAL LENS

(75) Inventors: Jean-Claude Duon, Mondeville (FR); Jorge Couto, Creteil (FR); Claude Fritsch, Paris (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 10/437,841

(22) Filed: May 14, 2003

(65) Prior Publication Data

US 2004/0036989 A1 Feb. 26, 2004

(30) Foreign Application Priority Data

May 14, 2002 (FR) .............................................. 02 05930

(51) Int. Cl.⁷ ................................................. G02B 7/02
(52) U.S. Cl. ........................ 359/818; 359/811; 359/830
(58) Field of Search ................................ 359/391–392, 359/811, 815–819, 829–830; 351/229–230; 396/344–347; 451/365, 384; 362/455

(56) References Cited

U.S. PATENT DOCUMENTS 2,532,971 A * 12/1950 van Leer et al. ............ 427/162
5,249,082 A * 9/1993 Newman ..................... 359/813
6,052,240 A * 4/2000 Ikari ........................... 359/819
6,469,844 B1 * 10/2002 Iwase et al. ................. 359/819
6,552,862 B2 * 4/2003 Dieker ........................ 359/819

FOREIGN PATENT DOCUMENTS

| DE | 3838012 | * 11/1988 |
| WO | WO 00/14295 | * 3/2000 |

* cited by examiner

*Primary Examiner*—Jordan M. Schwartz
*Assistant Examiner*—Jessica Stultz
(74) *Attorney, Agent, or Firm*—Fulbright & Jaworski, L.L.P.

(57) ABSTRACT

An individual carrier for an optical lens comprising, in a plastics one-block single part as directly molded:
- a globally ring-shaped base (1) with a central axis (100) and a median plane perpendicular to such a central axis,
- at least three plots (2, 3, 4; 52, 53, 54) projecting from the internal edge (5) of the base (1) for holding the lens through its edge, at least one (4) of such plots being resiliently moveable in translation along a radial direction (101) relative to said axis, between an internal rest position and a range of active external positions,
- a spring (6, 7) arranged between the moveable plot (4) and the base (1) for exerting a resilient return stress of the moveable plot (4) towards its rest position.

28 Claims, 4 Drawing Sheets

INDIVIDUAL CARRIER FOR AN OPTICAL LENS

The present invention generally relates to surface treating for optical lenses and, more particularly, although not exclusively, corrective or protective ophthalmic lenses. It relates more precisely to support such lenses during the treatment thereof.

It is meant under "ophthalmic lens" in the scope of the present invention and conventionally, a moulded and/or machined disc made from a mineral or synthetic material, with a convex front side and a concave back side, and which provides through contouring a spectacle glass to be fitted on a frame. Before contouring, the edge of such a lens has most often a globally cylindrical, circular or oval shape. But it is not systematically the case, so that, within the scope of the present invention, the lens edge to be treated should be considered as having any shape.

It is usual to apply to ophthalmic lenses, after their shaping through moulding or machining, one or more surface treatments aimed at imparting to them particular optical or mechanical features, such as abrasion resistance or antireflection properties. Applying such a treatment to an ophthalmic lens more often involves coating at least one layer of a coating material on one of its sides. The lens is also often heated at relative high temperatures up to 140° C.

Regarding more specially the coating step of a coating layer, it is important, for the optical quality of the lens being treated, that such a coating should be performed with a very good uniformity.

Conventionally, when it comes to coat a thin layer such as an antireflection layer, such a coating is carried out under vacuum, as disclosed, for example, in U.S. Pat. No. 2,532,971, with a relatively complex treating machine. It is enough, for understanding the present invention, to briefly mention that such a treatment practically involves arranging a set of lenses to be treated on a common carrier being rotatingly driven at a relatively median speed in the order of 50 rpm. In some machines, arranging each lens on the common career occurs by means of an individual carrier comprising, on the one hand, means for its removable fixing onto the common carrier and, on the other hand, means able to ensure that the lens is held all over the treatment thereof.

According to the teaching from U.S. Pat. No. 2,532,971, the individual carrier comprises a ring-shaped base with a circular profile the external side of which carries the means for its fixing on the common carrier and, carried by said base, three lens-holding plots through its edge. One of such plots is stationary relative to the base (while being optionally position controllable), whereas the two other plots are connected to the base by means of a curved spring blade inserted through its centre on the internal side of the base and having the two plots at its two free ends. The latter are thus provided with a radial mobility adapted for gripping the lens through its edge with a slight resilient clamping.

Moreover, at start for treating other types of substrates, such as silicon plates adapted for being used in the microelectronical field, another coating technology for a layer of material has been developed, performed by centrifugation and usually called "spin coating" in English. It is enough here for understanding the present invention to remind that, according to such a technology, a substrate is brought to rotate on itself and a small quantity of the coating material is coated on the side to be treated. The rotation speed of the substrate during the spreading phase of the material, higher than its rotation speed upon its coating, is relatively high and, in practice, higher than 1000 rpm, in order to provide an appropriate distribution of the material throughout the whole treated side of the substrate.

Applying such a spin coating treatment to an ophthalmic lens makes it possible to coat any types of layers, thin or thick, with good thickness regularity and at relatively high rates. For the implementation thereof, an individual lens carrier is frequently provided for as an interface for fixing the lens onto a rotating plate. Because of the high rotation speeds being used, it is important to provide for the fixation reliability for the lens, which implies on the one hand that the lens should be sufficiently accurately and firmly held on its individual carrier, and in any case, be resistant to centrifugal forces, and on the other hand, that the individual carrier itself has a sufficient seating and/or holding relationship on the rotating plate.

In DE-38 38 012, an individual carrier is disclosed comprising three clamping elements, each of them consisting in a lens-housing support finger and a clamping finger for pinching the lens. A feeder device makes it possible to vary the pression exerted on the lens depending on the rotation speed. A particularly complex product and, thus, little reliable and expensive, as well in the manufacturing as in the implementation stage, is obtained.

In WO-00/14295, it has been suggested to use a more refined carrier and, hence, easier to be applied. Such an ophthalmic lens carrier comprises a plane disc- or crown-shaped base, and being supported by such a base, three lens-holding plots through its edge. Two of such plots are stationary relative to the base, whereas the third plot is radially moveable between a rest internal position and a range of active external positions. A spring is arranged between the moveable plot and the base for exerting a resilient return stress toward its rest position, imparting thereby to the moveable plot a radial resilience suited for gripping the lens through its edge with a resilient clamping. More precisely, in one of the shown embodiments, the spring is present in the form of a resiliently flexible blade the two ends of which are inserted, through embedding posts, on the upper side of the base and the centre of which carries the moveable plot. It should be emphasized here that the term "embedding" is not adequate: in fact, the spring blade is simply stopped in rotation on each post, but keeps its sliding mobility along its longitudinal direction; otherwise the radial clearance of the moveable plot would be extremely reduced, even nil. As a result, the spring blade is, in such a context, necessarily separated from the posts and the base.

Although the structure of such a type of carrier is relatively simple, some inconvenients, mainly associated to the still high manufacturing and implementation costs involved upon assembling multiple elements still remain. More particularly, the feeding and assembling operations of such elements influence the cost price of such carriers. On the other hand, carrier cleaning after each treatment, indispensable for treatment reliability and quality, influence such times and costs of the treatment cycles. And the cost being still too high for such carriers, as well as their difficult recycling, resulting from their composite structure, are an obstacle to their use as a disposable item.

Therefore, it has become interesting, as well as for keeping an optimum quality as for reducing the treating costs of the lenses, to design a one use carrier providing both required holding and fixing qualities, a low cost price and a high easiness of use.

That is why, according to the invention, an individual optical lens carrier is provided, comprising within a plastics one-block single part directly as moulded:

a globally ring-shaped base with a central axis and a median plane perpendicular to such a central axis, at least three plots projecting from the internal edge of the base for holding the lens through its edge, at least one of such plots being resiliently moveable in translation along a radial direction relative to said axis, between an internal rest position and a range of active external positions, a spring arranged between the moveable plot and the base for exerting a resilient return stress of the moveable plot towards its rest position.

Therefore, at a lower cost, because obtained in a single moulding step, an individual lens carrier is obtained, exerting all the desired functions of holding the lens and fixing the carrier on the corresponding element of the treatment machine being used. The thus obtained one-block carrier is compact and easy to handle (manually or directly by an automated machine element), with no risk of disassembling the constituent parts thereof and with quite reduced risks of being deteriorated in the case of dropping or excessive impact. Additionally, the thus obtained carrier can be adapted to any type of treatment, more particularly, by spin coating or under vacuum, and will have to this end a base appropriately arranged for fixing it onto the corresponding machine type.

It is also provided, according to the invention, for the use of such a carrier type for surface treating a lens, in which the single use carrier is adapted for treating a single lens and is disposed of at the end of the treatment of such a lens. Such a single use implementation of the carrier is made possible because of the structure and the producing method thereof in a single one-block part, inducing low manufacturing cost and allowing for an easy recycling. It is therefore understood that such a single use is advantageous in the logistics field, mainly as it simplifies the (manual of automated) handlings of the carrier, and, most of all, avoids any carrier cleaning step to the advantage of simplicity and fluidity of the treatment cycles and, therefore, of a reduced implementation cost.

The base has advantageously an individual glass-identifying mark allowing an individual follow-up of the glass mounted on the carrier.

According to an advantageous feature of the invention, at least two plots being stationary on the base, the plots are arranged such that, whatever the position of the moveable plot on a 6 mm outward stroke from its rest position, the circular lens edge is, relative to the central axis of the base, offset towards the two stationary plots. Thus, in the case of a spin coating treatment during which the carrier and the glass it carries are rotatively driven at a high speed around the central axis of the carrier base, the glass does not exert any centrifugal stress on the resilient return moveable plot, but the centrifugal force being exerted on the glass on the contrary tends to press the latter in abutment against the stationary plots.

Preferably, the base has a flattened shape, with an axial dimension (i.e. a thickness) very substantially lower than its radial dimension (i.e. its width). Such a dimensional feature provides a dual benefit for using the carrier in a spin coating treatment for the lens. First a basis surface is obtained, enough for making possible the fixation of the carrier through one of the two sides of the base on the rotating plate of a spin coating treatment device provided with a pneumatic suction disc device, i.e. having a plurality of suction ports distributed on a circumference of the plate for maintaining the base against the plate by suction of its abutting side. Generally, it is possible by means of such a basis to allow for high rotation speeds, higher than 500 rpm, required by a spin coating treatment. On the other hand, for a right centrifugal removal of the excess of coated material, it is preferred that the axial dimension, i.e. the thickness, of the base be as small as possible, while remaining sufficiently stiff to provide a reliable and accurate holding.

According to an advantageous embodiment for its simplicity and accuracy, in particular regarding the moulding step, the spring comprises at least one material filament the neutral strand of which extends in a plane parallel to the median plane of the base. Preferably then, the plane of the neutral strand of the material filament merges into the median plane of the base which then advantageously forms a junction plane.

In particular, the spring may advantageously be present in the form of two material filaments, mutually symmetrical relative to a symmetry plane containing the central axis of the base and the translation direction of the moveable plot.

Each filament has then preferably at least one non rectilinear, curved or broken, part. Thereby, the range of radial resilient mobility of the spring is increased. This part may, for example, be corrugated, which allows for meeting both moulding constraints and search for a regular resilience on a broad range.

According to an advantageous feature of the invention, an axial blocking means of the moveable plot is provided for holding, at least when it is in an active position, the moveable plot in a stationary axial position, for example in the median plane, while keeping its radial mobility. It is indeed important to provide for a sufficient stiffness of the moveable plot in the axial direction, i.e. perpendicularly to the plane of the base, the only holding exerted by the spring being unable to be adapted to this end. Therefore, the axial blocking means does prevent the risks of an axial deformation of the spring and the moveable plot (i.e., the risks of a vertical collapse in the case of a spin coating treatment where the lens and its carrier are horizontally arranged) which would lead to a modification of the lens equilibrium, even to the break of its holding by the moveable plot, to the detriment of the quality and good running of the treatment. This has a particular importance when, as most usually, the treatment applied to the lens comprises a heating step at relatively high temperatures able to cause a softening of the constituent material of the carrier and, in particular, of the plots and the spring connecting it to the base.

In an advantageous embodiment, the blocking means is integrally moulded with the remainder of the carrier and comprises two radially mutually engaged parts, one moveable integral with the moveable plot and the other one stationary integral with the base and arranged to be disengaged one from the other in a rest position of the moveable plot and to engage with one another in an active position. The disengagement configuration of the two parts of the blocking means in a rest position has this big advantage to allow for the moulding in one single step, with no insert, of the whole carrier with the two parts of the blocking means.

Advantageously then, the axial blocking means additionally exerts a radial guiding action with its two parts being complementary in order to reach, when mutually engaged, a radial sliding connexion.

In an active position, i.e., when a lens is in position on the carrier or when a manual or an automatic operator acts on the moveable plot for positionning a lens, the thus formed sliding connexion advantageously counteracts any inadvertent tipping of the moveable plot over itself, not only around an axis parallel to the central axis of the base through an excessive bending of the spring, but also around an ortho-radial axis through spring twisting.

Still advantageously, when the carrier is in its gross initial condition of moulding and therefore in a rest position, both parts of the blocking means are connected to one another by at least one thin thread of material having a low mechanical strength, i.e. able to be broken when a manual radial stress is exerted leading to the mutual engagement of both parts. Both parts of the blocking means are thus held suitably blocked one relative to the other, with no offset adapted to impair their radial mutual engagement. A sufficient radial stress exerted onto the moveable plot leads to the rupture of the material thread and together to the mutual engagement of both parties. And such an engagement will not be compromised by the possible exertion of a stress comprising, besides its main radial component, a parasitic axial or orthoradial component, the thread counteracting any offset of the two parts as long as the engagement has not started. On the other hand, the material thread is also an integrity witness for the carrier, the rupture thereof showing a previous use or damage upon storage or transportation.

According to another advantageous feature of the invention, the material constituting the carrier is selected and the spring is arranged so that, at room temperature in the range from 15° C. to 140° C., with at least 10 cycles of flash heating for about 20 seconds at 140° C., the elastic modulus of the spring ranges between 3 N/mm and 10 N/mm. In fact, it is important that the radial clamping stress exerted by the spring on the edge of the lens, while remaining sufficient for a reliable holding of the lens even at high rotation speeds, should not be too high in order not to risk to distort, even only locally, the lens upon a thermal treatment leading to a relative softening of the lens. The treating temperatures may indeed be as high as 140° C.

Moreover, in order to limit the softening effects of the high treating temperatures on the carrier components and in particular the spring, the stiffness of which is desirably held as steady as possible, it is preferable to provide for the constitutive material of the carrier having a glass transition temperature higher than or equal to 150° C.

In order to secure the axial holding of the lens by the plots, while avoiding an excessive clamping for the reasons mentioned hereinabove, each plot having an abutment side facing the axis of the base, one at least of the plots has at least one notch on its abutment side.

For the carrier to be adapted to various lens thicknesses, the plot involved may have on its abutment side at least two nested notches.

Preferably, to avoid any tipping over or bending of the plots and generally with a view to symmetrically distribute stresses, the or each notch is centered on the base plane.

Moreover, in order to avoid or at least to limit the contact of the plots with the treated side of the lens or the coating applied on the latter, the or each notch preferably has a depth lower than 0.5 mm and advantageously higher than 0.2 mm so that it keeps some efficiency.

Other features and advantages of the invention will be evident from reading the following description of a particular embodiment given as a non limitative example.

It will be referred to the appended drawings, wherein.

Figure 1:
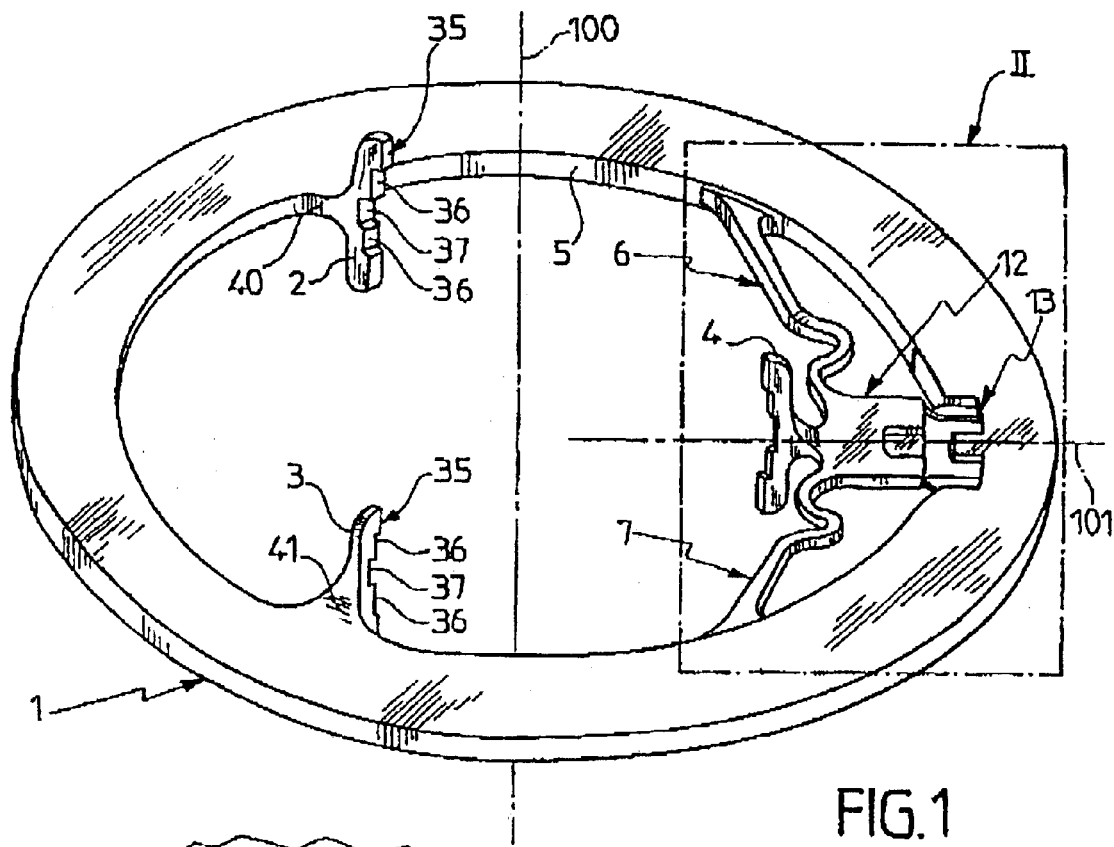
FIG. 1 is a global perspective top view showing an individual carrier for an optical lens according to the invention.
Figure 2:
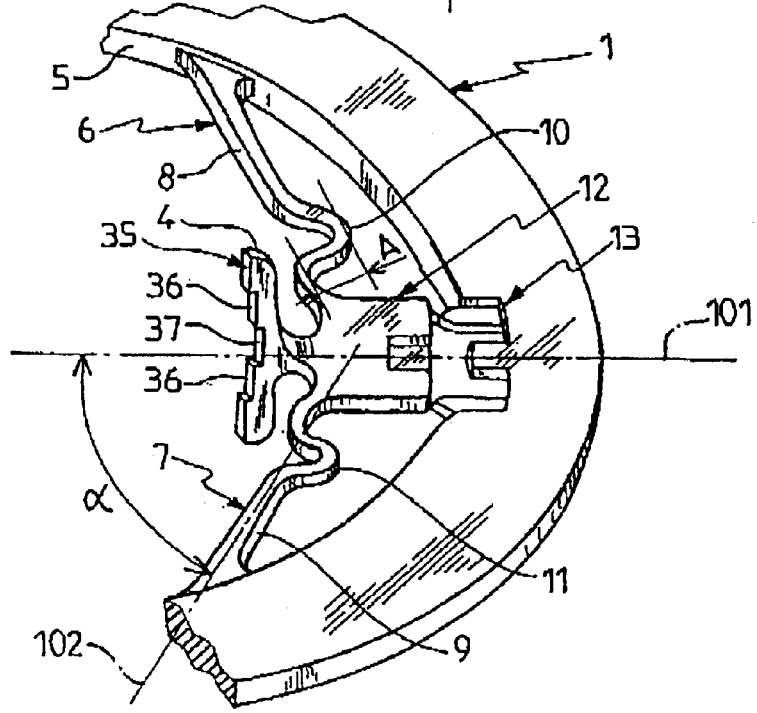
FIG. 2 is a reduced scale partial view of area II in FIG. 1.
Figure 3:
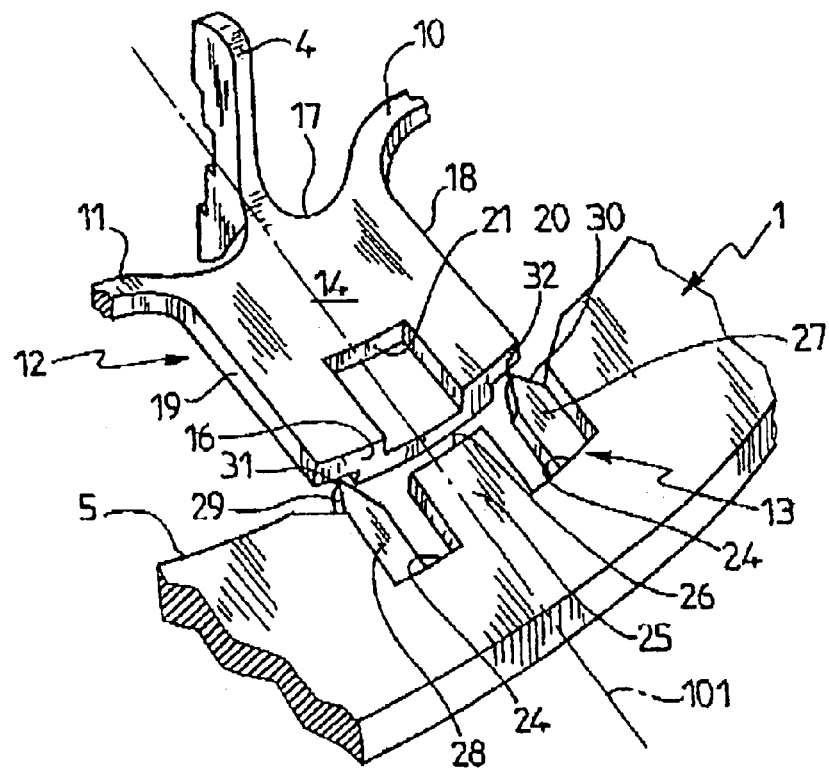
FIG. 3 is a partial view showing, still from the top but at an even smaller scale, the moveable plot with its blocking and guiding means in a rest position.

Referring to the figures, and more particularly to the global FIG. 1, an individual carrier for an optical lens according to the invention comprises a globally revolution ring base 1 around a central axis 100 and having a median plane perpendicular to such a central axis.

In the illustrated example, the carrier is more specifically adapted for a use for a spinning treatment for which the machines require, for fixing the lens carrier on the rotative plate thereof (not shown), a basis with quite a wide radial dimension whereas no particular axial dimension is required. Such a treatment indeed involves that the carrier should rotate at high speeds, higher than 500 rpm.

On the contrary, it is preferable that the axial dimension, i.e., the thickness of the base 1 should be as reduced as possible, while remaining sufficiently stiff for a reliable and precise holding. In fact, upon the spinning coating, the excess of material is ejected out of the lens in the form of droplets at a speed all the higher as the rotation speed is high. Within such a context, if the ring carrier is too thick, its lower edge forms some sort of a circumferential enclosure wall surrounding the lens and hindering the free ejection of the droplets, the latter bouncing against the internal edge of the carrier and falling then on the lens. The treatment quality, in particular regarding the coating regularity, is thereby impaired.

That is why the base 1 according to the invention has a flattened shape with an axial dimension (i.e. a thickness) very substantially lower than its radial dimension (i.e. its width). It is meant under "very substantially lower" an axial dimension such that the ratio between the external diameter less the internal diameter of the washer, on the one hand, and such an axial dimension on the other hand, be higher than or equal to 10. In absolute value, the thickness of the base 1 is anyway lower than 5 mm. It is, more precisely, in the suggested example, a washer with the following dimensions to within 20%:

external diameter: 125 mm, internal diameter: 90 mm, thickness (along the direction of the axis 100): 2 mm.

However, for the carrier to be adapted to any type of treatment, in particular, through spinning or under vacuum, the base will have possibly any globally annular shape (washer, crown, ring, etc.) with any section and will be suitably arranged for its fixation on the corresponding machine type. Thus, it could in particular have a general shape of a ring with a height higher than its thickess better suited to a use in a vacuum treating machine where fixing the lens carrier occurs through the external side of the ring.

For holding the lens through its edge, the carrier is provided with three plots 2, 3 and 4 projecting from the internal edge 5 of the base 1. These three plots are regularly distributed around the axis 100, thus forming between them two by two a 120 degree angle.

The plots 2 and 3 are stationary relative to the base 1 and are connected to the lower edge 5 of the latter by projections 40, 41 from this internal edge.

The plot 4 is resiliently moveable in translation, radially relative to the axis 100, i.e. following the direction of a radius 101 passing through the centre of the moveable plot 4. A spring is arranged between the moveable plot 4 and the base 1 for exerting a resilient return stress of the moveable plot 4 towards a rest position shown in FIG. 1.

Such a return spring is made in the form of two material filament 6, 7 the neutral strand (i.e. the central line) of which extends in the median plane of the base 1. The two spring filaments 6, 7 are moreover symmetrical one relative to the other relative to a symmetry plane containing the central axis 100 of the base 1 and the direction 101 of translation of the moveable plot 4. In such a case, these two filaments 6, 7 have a thickness slightly lower than that of base 1.

Each of the two filaments 6, 7 comprises two parts: a substantially rectilinear part 8, 9 and a non rectilinear part 10, 11.

The rectilinear part 8, 9 is connected with an internal edge 5 of the base 1 and forms with the symmetry plane, on the internal side of the base, an acute angle α, which, in this case, is 70 degrees to within 20%.

The non rectilinear part 10, 11 of the filament is adjacent to the moveable plot 4. It may be curved or broken and the function thereof is to give the moveable plot 4 a range of radial resilient mobility sufficient for enabling an easy positioning of the lens and, optionally, an adaptation with various lens diameters. In this case, such a non rectilinear part 10, 11 is curved and more precisely corrugated, enabling to meet both the moulding constraints and the search for a steady resilience on a wide range. Still more precisely, the corrugated part 10, 11 of the filament is made with a single ply.

Figure 4:
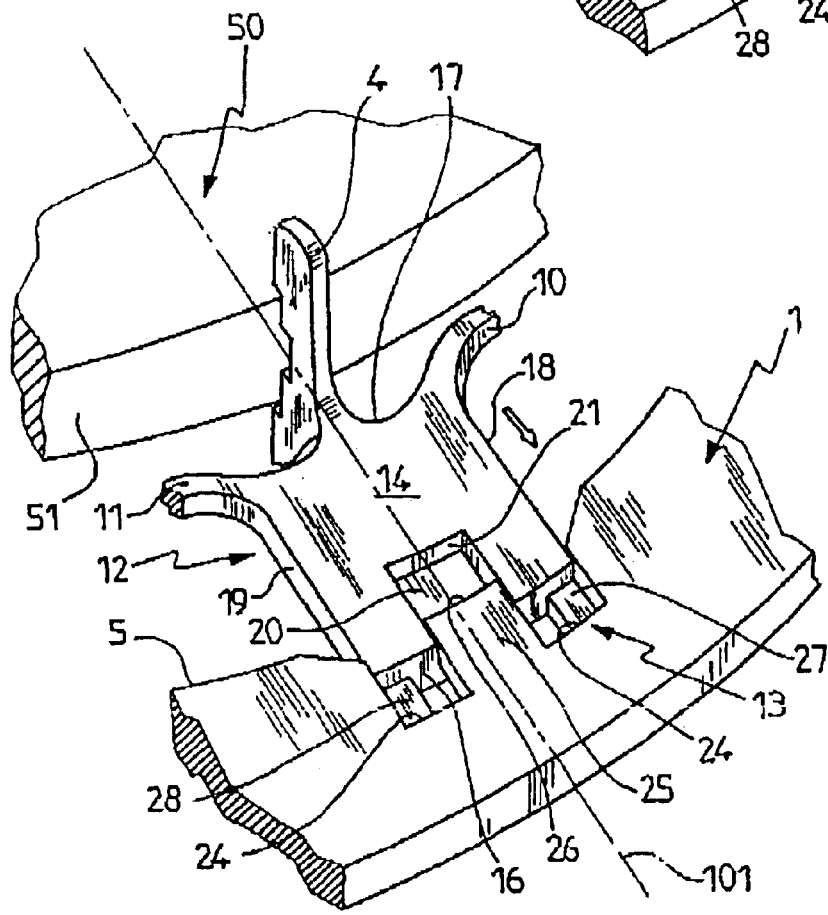
FIG. 4 is a view similar to FIG. 3 where the moveable plot is in an active position.
Figure 5:
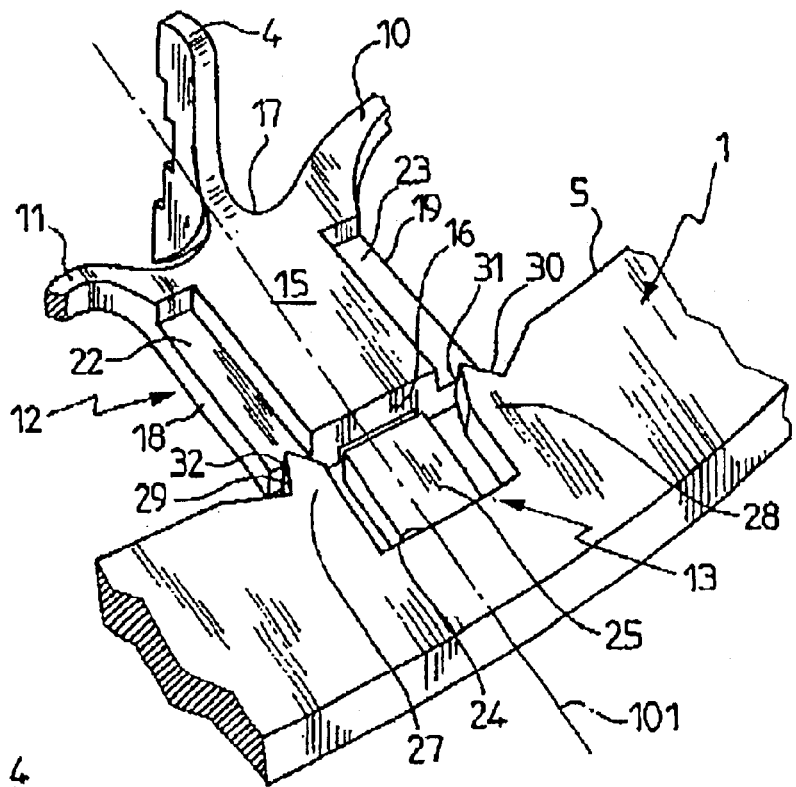
FIGS. 5 and 6 are bottom views respectively similar to FIGS. 3 and 4.
Figure 6:
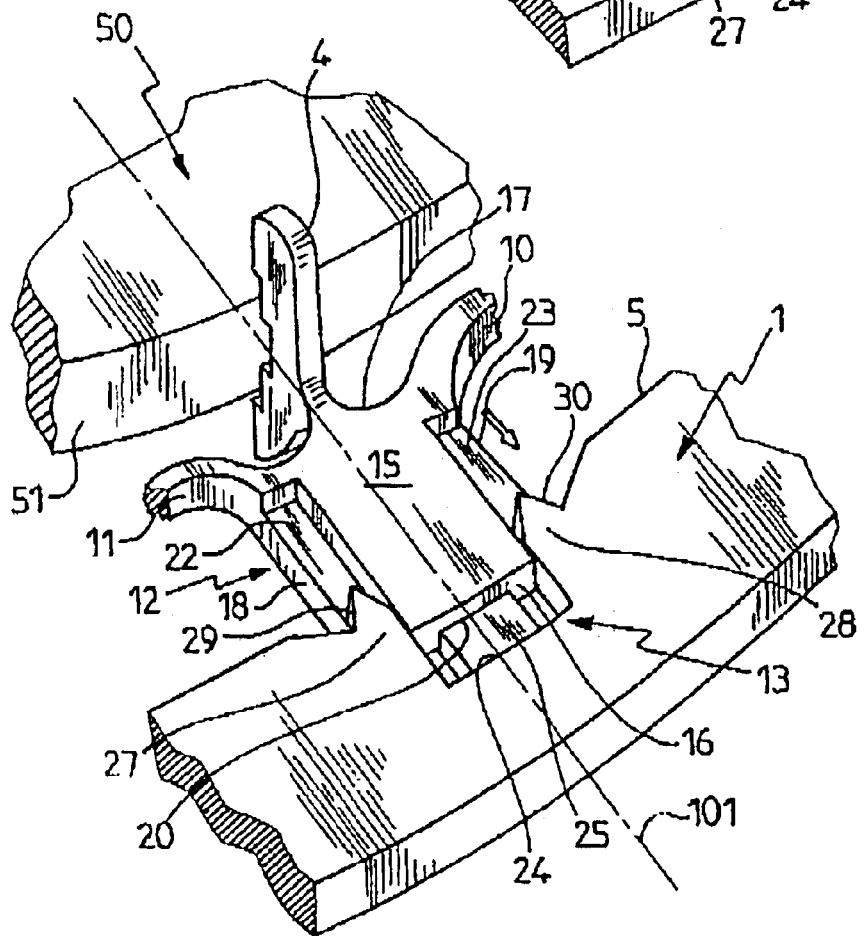

The moveable plot 4 is thus moveable between an internal rest position shown in FIGS. 1, 2, 3 and 5 and a range of active external positions starting from 1 mm from the rest position and covering the various lens diameters contemplated. FIGS. 4 and 6 show one of such active positions.

In practice, in the suggested embodiment, the plots are arranged for holding lenses with a diameter on the edge ranging from 68 to 73 mm, corresponding to a range of active external positions of 5 mm. The moveable plot 4 should therefore have, in order to exert its gripping function through radial resilient clamping, a useful source of 5+1=6 mm from its rest position. Such values of active external positions and useful stroke are given to within 20%.

More precisely, in the proposed example, the dimensions of each spring filament 6, 7 are the following to within 20%:

the single ply of the corrugated part 10, 11 of the filament has an amplitude equal to the useful stroke of the moveable plot 4, i.e. 6 mm to within 30%;

the length of the rectilinear part 8, 9, measured along its neutral (or central) strand is 20 mm;

the developed length of the corrugated part 10, 11 measured along its neutral (or central) strand is 20 mm; and the thickness of the filament measured along the direction of the axis 100 is steady on both parts and is 1.5 mm.

As far as the width, being measured in the median plane of the base 1, of each filament is concerned, one could provide for to within 20%:

either a steady width on the whole filament, for example 2 mm, the two parts, rectilinear and corrugated, having then the same resilient stiffness, or distinct widths for the two parts of the filament, with the width of corrugated part 10, 11 for example of 1.5 mm, reduced compared to that of the rectilinear part 8, 9, for example 2.5 mm, the rectilinear part 8, 9 being then substantially stiffer than the corrugated part 10, 11.

Other important features of the carrier according to the invention are the reliability, the accuracy and, hence, the holding firmness for the lens. In that respect, the determining element is the moveable plot 4, the moveable resilient connexion of which gives the base 1 per se a less good stiffness than the stationary one of the plots 2 and 3. The emphasis has thus been put on two aspects of the connexion of the moveable plot 4 with the base: the stiffness of the radial resilience of the spring 6, 7 on the one hand and the strength to the axial collapse and tipping over of the moveable plot 4.

It is thus first the spring stiffness 6, 7 that should be appropriately adjusted. The aim is indeed to obtain the best compromise so that the radial clamping stress exerted by the spring on the lens edge, while remaining sufficient for a reliable lens holding even at high rotation speeds, be not too high in order not to risk distorting, even only locally, the lens during the thermal treatment generating a relative softening of the lens.

Concretely, experiments have allowed to reach satisfactory results for an elastic modulus of the spring ranging from 3 to 10 N/mm and the most advantageous compromise has been found between 6 and 8 N/mm. Such values should be obtained in the following conditions to within 20%:

on the 6 mm stroke contemplated towards the outside from its rest position and beyond 1 mm from this rest position, for a room temperature measured close to the carrier ranging from 15° C. to 35° C., with at least 10 cycles of flash heating for about 20 seconds at 140° C. (it is meant under "flash" heating, a sudden increase for a short duration of the temperature of the carrier, obtained for example by using a hot air blowing means).

In practice, in order to obtain such values, it is possible to act on two parameters:

the choice of the carrier constitutive material and the arrangement (shape and dimensions) of the spring filaments 6, 7.

It is then important to assure the sufficient stiffness of the moveable plot 4 along the central axis 100 of the base 1, the only holding exerted by the spring filaments 6, 7 being able to appear unsatisfactory in that respect. Indeed, an axial blocking means of the moveable plot 4 is arranged for holding, when in active position, the moveable plot 4 in a stationary axial position, i.e. in this case, centred on the plane of the base 1, while keeping its radial mobility. Thus, the axial blocking means does prevent the risks of an axial deformation of the spring 6, 7 and the moveable plot 4 (i.e., the risks of a vertical collapse for the case of a spinning treatment where the lens and the carrier thereof are horizontally arranged) which would lead to a change of the lens equilibrium, even the break of its holding by the moveable plot 4, to the detriment of the quality and the good course of the treatment. This has a particular importance when, as most usual, the treatment applied to the lens comprises a heating step at relatively high temperatures, up to 140° C., being able to cause a softening of the constituent material of the carrier and, in particular, of the moveable plot 4 and the spring filament 6, 7 connecting it to the base 1.

The blocking means comprises two parts with a radial mutual engagement, with a moveable part 12 integral with the moveable plot 4 and a stationary part 13 integral with the base 1. More precisely, the stationary part 13 forms an axis slide 101 arranged to slidingly accommodate the moveable part 12 forming thereby a drawer. The drawer 12 and the slide 13 are symmetrical with respect to the symmetry plane formed by the axes 100 and 101.

It will be now referred, for a better understanding of the drawings, to FIGS. 3 to 6.

The drawer 12 has a general form of a platelet. It has an upper side 14 and a lower side 15. Such sides 14 and 15 are referred to as higher and lower for simple distinctive commodity and referring to FIGS. 1 to 4, without any limitation, on condition that the carrier can be used on one side as on the other side and can be turned over with the lens it carries for a double side treatment of the latter. The drawer 12 has moreover a free cylindrical external edge 16 with an axis 100, an internal edge 17 carrying the moveable plot 4 and with which the corrugated part 10, 11 of each of the filaments 6, 7 is connected, and two lateral edges 18, 19 parallel to the axis 101.

A notch 20 is recessed from the external edge 16 and from the upper side 14 of the drawer 12. Such a notch has thus a bottom 21 which is parallel to the external edge 16 and which forms a recess for it. On the opposite side, two angle grooves 22, 23 parallel to the axis 101 are recessed from the side edges 18, 19 and the lower side 15, symmetrically from either side of the symmetry plane formed by the axes 100 and 101.

The slide 13 is arranged in the base body 1 in recess of its internal edge 5. It comprises a receiving recess 24 for the drawer 12 and three rails 25, 27, 28 surrounding and limiting such a recess in parallel to the axis 101.

The rail 25 is centred on the symmetry plane formed by the axes 100 and 101 and being flush with the upper side of the base 1. It has, along the axis 100, a height lower than that of the base 1 and equal to that of the notch 20, so that, when the moveable plot 4 is pushed in an active position, the rail 25 is embedded into the notch 20 and forms an axial abutment, along the axis 100, for the drawer 14. The rail 25 has also a free internal edge 26 against which the bottom 21 of the notch 20 is abutting in order to limit the stroke of the moveable plot 4. Such a stroke limitation prevents the spring filament 6, 7 from being damaged through excessive distortion. It has been seen previously that in the proposed example, such a stroke from the rest position is limited to approximately 6 mm.

The rails 27, 28 are arranged symmetrically on either side of the symmetry plane formed by the axes 100 and 101 and being flush with the lower side of the base 1. Each of the rails 27, 28 has, along the axis 100, a height lower than that of the base 1 and equal to that of the grooves 22, 23, so that, when the moveable plot 4 is pushed in an active position, the rails 27, 28 are embedded into the grooves 22, 23. The rails 27, 28 thus form an axial abutment, along the axis 100, for the drawer 14 which is complementary to that formed by the rail 25 in the other direction. This way, the drawer 12 and, consequently, the moveable plot 4 are immobilized in a certain position along the axis 100 (i.e. in that case vertically), in both directions, (i.e. upwards and downwards), which allows the carrier to be turned over for a double side treatment of the lens. The drawer 12 and the moveable plot 4 hold obviously their radial mobility along the axis 101.

On the other hand, in order to facilitate the penetration of the drawer into the slide, even with a slight off-centering, the rails 27, 28 are each provided with a chamfered free internal end 29, 30, in this case, in the form of a tip extending inwardly beyond the lower edge 26 of the rail 25 in order to assure, the case being, a new wedging on the axis 101 of the drawer 12 before the track 25 penetrates into the notch 20.

In a rest position of the moveable plot 14, the drawer 12 is disengaged from the slide 13. Moreover, in such a rest position, the drawer 12 is facing the slide 13 and its external edge 16 flushes with the entry thereof, so that as soon as the drawer 12 is pushed outwardly and in any case after a 1 mm stroke, in an active position, it penetrates into the slide 13.

The cooperation of the drawer 12 and the slide thus exerts, beside the axial blocking action, a radial guiding action, its two parts being complementary in order to reach, when they are mutually engaged, a radial sliding connexion.

In an active position, i.e. when a lens is arranged on the carrier or when a manual or automatic operator acts on the moveable plot in order to position a lens, the thus formed sliding connexion advantageously hinders any inadvertent tipping over of the moveable plot on itself, not only around an axis parallel to the central axis of the base through an excessive flexure of the spring, but also around an orthoradial axis through spring twisting.

Moreover, optionally, when the carrier is in its initial moulding raw condition and, thus, in a rest position, the drawer 12 and the slide 13 are connected to each another by two thin threads of material 31, 32. In the case in point, such threads are arranged between the tip of the ends 29, 30 of the rails 27, 28 and the mouth of the grooves 22, 23 on the external edge 16 of the drawer 12. Such a thread has a low mechanical strength, with optionally a break-initiating point, which means that it is adapted to be broken by exerting a manual radial stress leading to the engagement of the drawer 12 in the slide 13. The carrier and, in particular, its blocking and guiding means are thus kept ready to use, the drawer 12 being appropriately wedged relative to the slide 13 along the axis 101, without any offset being able to impair their radial mutual engagement. A sufficient radial stress exerted on the moveable plot 4 leads to the rupture of the material thread and, concurrently, the engagement of the drawer 12 in the slide 13. And such an engagement will not be compromised by the optional exertion of a stress comprising, in addition to its main radial component, a parasite axial or orthoradial component, the material thread hindering any off-setting of the drawer as long as the engagement is not initiated. Moreover, the material thread is also an integrity witness for the carrier, its rupture showing a previous use or damage upon storage or transportation.

The three plots 2, 3, 4 are identical. Each plot has here the form of an elongated finger, arranged in parallel to the central axis 100 of the base 1. More precisely, in the suggested example, each of the plots has, to within 20%, the following dimensions:

a 16 mm height, which allows to cover the major part of the thickness range in the usual ophthalmic lenses, a 1.5 mm width, measured in the median plane of the base 1, perpendicularly to the sliding radial direction 101.

Each plot has an abutting side 35 opposite the central axis 100. Such an abutting side is provided with one or more notches provided for accommodating the edge of the lens 50, as illustrated in FIG. 6, for ensuring the axial holding (i.e. along the axis 100) of the lens by the plots 2, 3, 4, while avoiding an excessive clamping for the previously mentioned reasons.

In the embodiment illustrated in FIGS. 1 to 6 and for adapting the carrier to various lens thicknesses, each plot has on its abutting side two nested notches 36, 37 with different heights, the smallest one 37 being arranged in the bottom of the biggest one 36. Thus, for example, for treating lenses with an edge thickness ranging from 0 to 4 mm, a carrier will be used in which the big notch 36 and the small notch 37 have, along the axis 100 of the base 1, respective heights of 4 and 2 mm to within 20%. The small notch 37 of 2 mm then accommodates lenses with a thickness ranging from 0 to 2 mm, whereas the big notch 36 of 4 mm accommodates lenses with a thickness in a range from 2 to 4 mm. It will also be possible to provide more nested notches, for example, 3, 4 or even 5.

Figure 7:
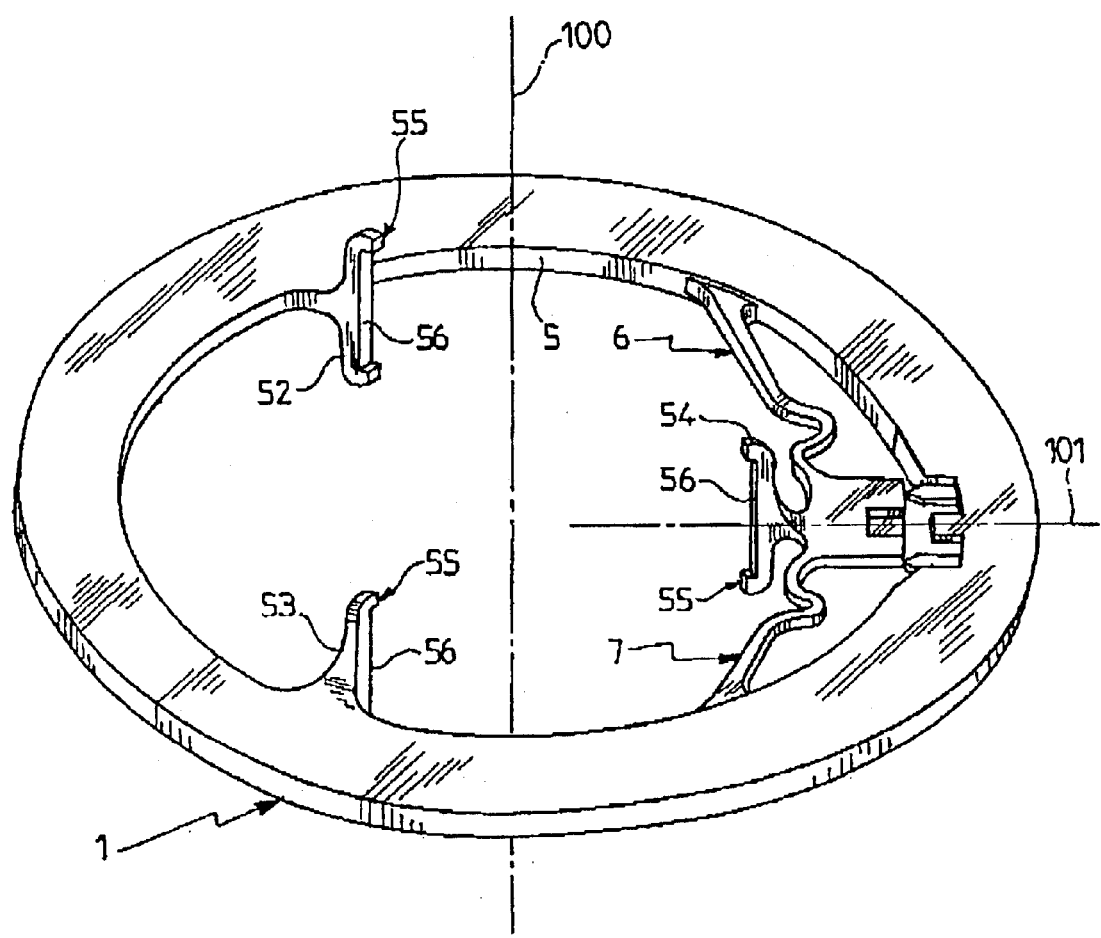
FIG. 7 is a view similar to FIG. 1, showing an alternative embodiment of the holding plots adapted for the thick edged lenses.

On the other hand, as shown in FIG. 7, for lenses having an edge thickness higher than or equal to the height of the highest of both notches, i.e. in the example given hereabove, a thickness higher than or equal to 4 mm, another carrier will be used, further similar to that previously described, comprising according to FIG. 7, plots 52, 53, 54 similar respectively to plots 2, 3, 4 of FIGS. 1 to 6, but having each on their abutting side 55 one single big notch 56 extending on more than the two thirds of the total height of the plot. In the suggested example, the notch 55 has a height along the central axis 100 of 13 mm to within 20%, each plot having a 16 mm height to within 20%.

Whatever the considered plot execution may be, with one or more notches, the notch(es) 36, 37, 56 is or are centred on the median plane of the base 1. A symmetrical distribution of the stresses is thus obtained, allowing among others to avoid any tipping over or bending of the plots and in particular of the moveable plot 4.

The plots 2, 3, 4 are arranged so that, whatever the position of the moveable plot 4 may be on its 6 mm stroke towards the outside from its rest position, the circular edge of a lens mounted on the carrier are, with respect to the rotation axis of the carrier which, in that case, is the central axis 100 of the base, either centred or off-centred towards the two stationary plots 2, 3. Thus, in the case of a spinning treatment, during which the carrier and the glass it carries are rotatingly driven at a high speed around the central axis 100, the glass does not exert any centrifugal stress on the resilient return moveable plot 4. Even better, with an off-setting, the centrifugal force exerted on the glass tends, on the contrary, to press the latter in abutment against the stationary plots 2, 3.

Additionally, in order to avoid or at least to limit the contact of the plots with the treated side of the lens or the coating applied on the later, the or each notch 36, 37, 56 has preferably a depth lower than 0.5 mm and advantageously higher than 0.2 mm for it to keep some efficiency. In the suggested embodiment, the or each notch 36, 37, 56 has a 0.3 mm depth to within 10%.

It should be noted, that, although this is not perfectly apparent from the appended drawings, it is preferable for the internal and external edges of the base 1, filaments 6, 7 and plots 2, 3, 4 to be blunt in order to avoid as far as possible to oppose perpendicular walls to the path of the varnish droplets ejected from the glasses, specially in the case of a spinning treatment.

The whole carrier, with its base 1, its plots 2, 3, 4, the spring 6, 7 and the blocking and guiding means 12, 13 is manufactured in a plastics one-block single part as directly moulded. The moulding operation is carried out with two half-moulds assembled according to a junction plane coinciding with the median plane of the base 1.

In order to limit the softening effects of the high treatment temperatures on the carrier components and in particular the spring filaments, the stiffness of which is desirably maintained as constant as possible, it is preferable to provide for a constitutive material of the carrier to have a glass transition temperature higher than or equal to 150° C.

The plastics material to be used may in particular be a polyacetal copolymeric resin, for example that known under the commercial name SNIATAL® from RHODIA manufacturer, having the advantage of having a high stability when used at high temperature as well as a chemical strength satisfactory for the contemplated treatment applications. It has the following properties:

flexural modulus: 2670 MPa at 23° C., flexural temperature under load: 158° C. under 0.46 MPa.

For a practical production and with no insert of this moulding, the spring filaments 6, 7 extend mainly along the median plane of the base 1. Moreover, in the suggested embodiment, several symmetries have been looked at:

the whole carrier admits as a symmetry plane the plane containing the central axis 100 of the base 1 and the translation direction 101 for the moveable plot 4;

the median plane of the base 1, a junction plane, represents a symmetry plane for most of the base 1, including the projections 40, 41 for connecting the stationary plots 2, 3, but excluding the slide 13, the plots 2, 3, 4, excluding the drawer 12 associated with the moveable plot 4, and the spring filaments 6, 7.

It should additionally be noted that both parts, the drawer 12 and the slide 13, of the blocking and guiding means are moulded integrally with the remainder of the carrier. The disengagement configuration of the drawer 12 relative to the slide 13 in a rest position allows for their moulding in one single operation with the whole carrier.

The carrier that has been described is, according to the invention, intended to be used for a surface treatment of a lens, especially through spinning. In operation, such as shown on FIG. 4, the optical lens 50 is simply inserted, by its edge 51, between the two stationary plots 2, 3 and the moveable plot 4. The latter will have preliminarily been radially biased outwardly against the return stress exerted by the spring filaments 6, 7.

The moveable plot 4 is then released and, under the action of the spring filaments 6, 7, comes back against the edge 51 of the lens 50. The lens 50 is thereby held tightened by its edge 51 between the moveable plot 4 and the stationary plots 2, 3.

The lens-supporting carrier is then positioned on or in the adequate element of the processing machine being used (not shown). The base 1 serves as an interface with this machine element and is arranged accordingly in terms of its shape, its dimensions and its possible specific arrangements (groove, shoulder, etc). In the case of the deposition of a coating layer through spinning, the base may have the particular form previously described and illustrated in the figures, i.e. a general washer shape having two wide abutment sides ("upper" and "lower") showing a good seating on the plate of the spinning machine.

For a double side treatment, it is sufficient to turn over the carrier. By virtue of the ring type shape of the base, the lens can also be accessed by its two sides.

On the other hand, according to the invention, the one-block carrier as directly moulded is particularly suited to an implementation of the single use type. It is then dedicated to treating a single optical lens and is discarded at the end of the treatment of such a lens on one or two sides. Such a single use processing of the carrier is made possible by virtue of the structure and the obtention method thereof in an one-block single piece, inducing low manufacturing costs and allowing for an easy recycling. It is also understood that such a single use is advantageous in the field of logistics especially in that it simplifies the (manual or automated) handlings of the carrier, and mainly avoids any cleaning step of the carrier to the benefit of the safety of the environment and people (towards cleaning chemicals), as well as the simplicity and the fluidity of the treatment cycles and, hence, a lower cost.

The base then advantageously carries an individual glass-identifying mark as moulded. Such a mark may for example have the form of a bar code. Such an identification mark may then be used in association with each particular glass and, consequently, with the treatments that it is to be subjected to, for ensuring the follow up of the glass, both in terms of logistics and treatment method. It is thus particularly possible to customize the various treatment operations to be applied to each glass within a multi-method facility.

It is also possible, using an individual marking method, to steer each glass towards the stations dedicated to the treatment operations required for the involved glass. Such a steering may be performed within a single treatment site or between several delocalized sites.

What is claimed is:

1. A carrier for an optical lens comprising:

a substantially ring-shaped base with a central axis and a median plane perpendicular to such a central axis, at least three plots projecting from an internal edge of the base, the plots adapted to hold a lens during use, at least one of such plots being resiliently moveable in translation along a substantially radial translation direction relative to said axis, between an internal rest position and a range of active external positions; and a spring arranged between the moveable plot and the base, adapted to exert a resilient return stress on the moveable plot towards the rest position;

wherein the carrier is further defined as being comprised of molded plastic, and wherein the material for the carrier is selected and the spring is arranged so that, at a room temperature in the range between 15° C. and 35° C., with at least 10 cycles of flash heating for about 20 seconds at 140° C., the elastic modulus of the spring ranges between 3 N/mm and 10 N/mm.

2. The carrier of claim 1, further defined as comprised of a single block of molded plastic.

3. The carrier of claim 1, wherein at least two plots are adapted to be stationary on the base during use and are arranged so that, whatever the position of the moveable plot on an outward stroke from its rest position, the circular edge of the lens is, relative to the central axis of the base, either centered or off-centered relative to the two stationary plots.

4. The carrier of claim 1, wherein the base has a flattened shape with a thickness very substantially lower than its width.

5. The carrier of claim 1, wherein the spring comprises at least one material filament having a neutral strand which extends in a plane parallel to a median plane of the base.

6. The carrier of claim 5, wherein a plane of the neutral strand of the material filament meets the median plane of the base.

7. The carrier of claim 6, wherein the median plane of the base forms a junction plane.

8. The carrier claim 5, wherein the spring is made in the form of two material filaments, which material filaments are symmetrical one to the other relative to a symmetry plane containing the central axis of the base and the translation direction of the moveable plot.

9. The carrier of claim 8, wherein each filament comprises at least one curved or broken non-rectilinear part.

10. The carrier of claim 9, wherein each spring filament comprises a corrugated part.

11. The carrier of claim 10, wherein the corrugated part of each spring filament is adjacent to the moveable plot, and the remainder of the filament is made from a rectilinear part connected with a lower edge of the base.

12. The carrier of claim 11, wherein the rectilinear part of each spring filament forms with a symmetry plane, on the internal side of the base, an acute angle ($\alpha$).

13. The carrier of claim 10, wherein the corrugated part of each spring filament is comprised of a single ply.

14. The carrier of claim 10, wherein the corrugated part is connected to the moveable part of an axial block which is integral with the moveable plot.

15. The carrier of claim 1, wherein the moveable plot is adapted with an axial block for holding, during use, the moveable plot in a stationary axial position, while keeping its radial mobility.

16. The carrier of claim 15, wherein the axial block is integrally molded with the remainder of the carrier and comprises at least two parts with a radial mutual engagement, one moveable during use and integral with the moveable plot and the other stationary during use and integral with the base, the at least two parts arranged to be disengaged one from the other in a rest position of the moveable plot and to engage with one another in an active position.

17. The carrier of claim 16, wherein the axial block additionally exerts a radial guiding action, both its parts being complementary in order to reach, when mutually engaged, a radial sliding connection.

18. The carrier of claim 16, wherein when the carrier is in a gross initial condition of molding, both parts of the axial block are connected to one another by at least a small thread of material having a low mechanical strength.

19. The carrier of claim 1, wherein the material for the carrier has a glass transition temperature higher than or equal to 150° C.

20. The carrier of claim 19, wherein the material is further defined as a polyacetal copolymeric resin.

21. The carrier of claim 1, wherein each plot has an abutment, and least one of the plots has at least one notch on its abutment side.

22. The of claim 21, wherein at least two of the plots have on their abutting sides at least two nested notches.

23. The carrier of claim 22, wherein the at least two nested notches comprise a notch of substantially 4 mm in height along the axis of the base and a notch of substantially 2 mm in height along the axis of the base.

24. The carrier of claim 22, wherein at least one plot has on an abutting side a single notch of substantially 13 mm height along the axis of the base.

25. The carrier of claim 21, the at least one notch is centered on the median plane of the base.

26. The carrier of claim 21, wherein the at least one notch has a depth ranging from substantially 0.2 to 0.5 mm.

27. The carrier of claim 1, wherein the base comprises a glass-identifying mark.

28. The carrier of claim 1, further defined as a carrier adapted as a single use carrier for treating a single lens and then being discarded.

* * * * *